United States Patent Office 3,540,944
Patented Nov. 17, 1970

3,540,944
WELDING FLUX FOR NICKEL-SILICON-TITANIUM-COPPER-MOLYBDENUM ALLOYS
Peter Sharples, Inglewood, Calif. assignor to The International Nickel Company, Inc., New York, N.Y., a corporation of Delaware
No Drawing. Filed May 20, 1968, Ser. No. 730,602
Claims priority, application Great Britain, May 23, 1967, 23,940/67
Int. Cl. B23k 35/34, 35/36
U.S. Cl. 148—24          2 Claims

ABSTRACT OF THE DISCLOSURE

Quinary nickel-base alloys containing silicon, titanium, copper and molybdenum are welded with filler metal of similar quinary alloy composition which is applied by oxyacetylene welding with special flux consisting essentially of a dry powder mixture of 30–60% sodium fluoride, about 30–60% dehydrated sodium silicate, about 5–15% lithium chloride, and up to 35% sodium carbonate.

---

The present invention relates to welding nickel-base alloys and more particularly to processes and materials for welding nickel-base alloys that contain silicon, titanium, copper and molybdenum.

It is known that certain quinary nickel-base alloys containing 7% to 11% silicon, 1% to 5% titanium, with the total of the silicon content plus one-half the titanium content being 9.5% to 11.5%, 1% to 4% copper, 1% to 4% molybdenum and the balance substantially nickel, with or without limited amounts of impurities or optional elements, e.g., iron, manganese or cobalt, have excellent resistance to attack by sulfuric acid. For instance, corrosion resistance capabilities, mechanical properties, microstructural characteristics, including a substantially beta-phase microstructure, and advantageous compositions of such alloys are described in U.S. Pat. No. 3,311,470. Castings made from these quinary alloys are useful for holding sulfuric acid, even at boiling temperatures, and are less brittle than castings commonly made of iron-silicon alloys such as the iron-14.5% silicon alloys which were used previously to resist attack by sulfuric acid.

In view of the useful corrosion resistant and mechanical characteristics of the aforementioned quinary alloys it has been very desirable to be able to weld the alloys in order to repair defective or damaged castings or to join small articles together. For such purposes the welds should be free from detrimental cracks and porosity and should have corrosion resistance that is at least as good as that of the base metal. However, unsatisfactory results, e.g., cracking, have occurred when attempts were made to weld these alloys by conventional techniques. Thus, there have been needs for new and substantially improved means for welding the subject nickel-silicon-titanium-copper-molybdenum alloys and especially for producing satisfactorily sound and corrosion resistant welds in articles made of these alloys. Insofar as I am aware, none of the welding methods in practice heretofore have been fully satisfactory for welding beta-phase alloys containing 7% to 11% silicon, 1% to 5% titanium, 1% to 4% copper, 1% to 4% molybdenum and the balance substantially nickel.

There has now been discovered a new process that produces good welds in the subject nickel-silicon-titanium-copper-molybdenum alloys and there has also been discovered a new flux material that is especially well suited for welding these alloys.

It is an object of the present invention to provide a new welding process.

Another object of the invention is to provide a new welding flux.

Other objects and advantages of the invention will become apparent from the following description.

Generally speaking the present invention contemplates a process of gas torch welding using a dry powder flux wherein a quinary alloy containing at least 7% silicon and about 1% to about 5% titanium with the sum of the percentage of silicon plus one-half the percentage of titanium being 9.5% to 11.5%, about 1% to about 4% copper, about 1% to about 4% molybdenum and with the balance substantially nickel is preheated to a temperature of at least about 600° C. and oxyacetylene welded with deposition of metal from a preheated welding rod having a specially correlated nickel-silicon-titanium-copper-molybdenum composition and with protective application of a special welding flux provided in the invention.

The flux is applied from the weld rod, to which it adheres when the rod is hot. The rod is of course heated during welding and is also preheated, advantageously, to a temperature of at least about 600° C., e.g., about 900° C., in order to obtain good adherence of the flux to the rod. An advantageous practice in carrying out the invention is to dip a considerable length of the preheated rod in the flux and rotate the rod in the flux to provide a coating of the flux along the length of the rod and then to oxyacetylene weld with the coated road. Techniques of skill in oxyacetylene welding are of course well known to those in the art and it will be understood that known techniques for skillful welding with oxyacetylene gas torches are applied in conjunction with the new welding process provided herein.

In the present invention the composition of the flux is a matter of importance. For obtaining good results in welding the subject quinary alloy, the flux must readily dissolve the refractory oxides of titanium which form during welding; it must in the molten state provide a coherent film to cover and protect the weld pool to avoid severe gas porosity in the ensuing weld; and finally it must adhere in reasonable quantity to the hot filler rod so that enough of the flux can be transferred to the joint during welding. To obtain these results the flux of the invention contains about 30% to about 60% of sodium fluoride, for dissolving titanium dioxide, about 30% to about 60% dehydrated sodium silicate, which helps form a glass-like protective film, and thus aids in preventing porosity in the finished weld, and in addition contains about 5% to about 15% lithium chloride, which melts when a hot filler rod is dipped into the flux during welding and, provided the lithium chloride is intimately mixed with the other constituents, causes the flux as a whole to adhere well to the rod so that it can be transferred to the weld during welding. All compositional percentages set forth herein are by weight. While the flux can also contain harmless impurities and minor proportions of optional ingredients, e.g., up to 35% sodium carbonate, the flux is maintained essentially free of boron and boron-containing compounds, e.g., borax, in order to avoid unsatisfactory results, such as hot cracking in the weld. The needs of the invention are advantageously fulfilled with a particularly suitable flux which consists of 45% to 55% sodium fluoride, 35% to 45% dehydrated sodium silicate and 5% to 15% lithium chloride.

In preparing the flux the constituents, which are dry powders, should be mixed thoroughly together and it is best to prepare the flux immediately before use. If the flux is to be stored, it must be kept in an airtight vessel since lithium chloride readily absorbs atmospheric moisture and so should be used in the anhydrous form.

Of the three constituents of the flux, lithium chloride has the lowset melting point, melting at about 600° C., and it is this which assists primarily in giving adherence of the flux to the welding rod.

It will readily be understood that the object is to produce the same microstructure in the deposited weld metal as in the parent metal of the article(s) being welded. To achieve this object, account must be taken of the loss of titanium as oxide in the flux and of dilution of the molten welding rod by the molten metal of the members that are being welded. It has been found that rather less than 1/10 of the total titanium in the weld pool is lost during the welding. The amount of additional titanium required in the welding rod to compensate for losses from the weld pool clearly will depend on how great a proportion of the weld pool is derived from the welding rod, that is, on the extent of weld dilution. For optimum results in practice the titanium content of the welding rod should be 1.5 times that in the alloy to be welded. However, adequate matching of the microstructures is obtained if the percentage of titanium, which must lie between 1.1% and 6%, is also controlled within 1.1 to 1.5, e.g., about 1.2 times the quantity [(percent Ti) ±0.5%], where (percent Ti) is the prcentage of titanium in the alloy that is being welded. Thus, the foregoing bracketed quantity is a titanium range of from 0.5% less than and up to 0.5% more than the percentage of titanium in the article to be welded. The remainder of the composition of the welding rod should be the same as that of the alloy that is being welded if the best result is to be obtained, and in any case the rod contains from 7% to 11% silicon, 1% to 4% copper and from 1% to 4% molybdenum, and has a nickel base.

From the point of view of obtaining good corrosion resistance in the weldment, the base metal, e.g., a casting or a pair of pipe members to be welded in the present process, advantageously contains in addition to the balance of nickel from 9.25% to 10% silicon, 2.5% to 3% titanium, 2% to 3.5% copper and 2%, or 2.5%, to 3.5% molybdenum. It is found that for welding these advantageous alloys a welding rod containing in addition to the balance of nickel about 9.5% silicon, about 2.8% copper, about 3% molybdenum and about 4% titanium is especially satisfactory. This titanium content of about 4%, e.g., 3.85% titanium, provides good tolerance for weld dilution and ensures obtaining substantially the same microstructure in the weld metal as in the parent material.

Where a nickel-silicon-titanium-copper-molybdenum alloy is referred to herein as having a balance that is substantially or essentially nickel, it is to be understood that along with nickel the balance may contain impurities or small amounts of optional elements that do not negate the desired characteristics, especially corrosion resistance and the ductility, of the alloy. In this connection, it is particularly noted that the impurities and other elements referred to in U.S. Pat. No. 3,311,470 as being possibly present in the alloy thereof may also be present in an alloy for the base metal or filler rod referred to herein, e.g., such an alloy can contain up to 3% iron, up to 1% manganese and/or up to 10% cobalt provided the total of these elements is such that the relationship 0.33 (percent Fe)+(percent Mn)+0.1 (percent Co)

is not greater than unity.

For the purpose of giving those skilled in the art a better understanding of the invention and a better appreciation of the advantages thereof, the following illustrative example is given.

EXAMPLE

A cylindrical ring of 5 inches outside diameter, ½ inch wall thickness and 2½ inches width made of an alloy containing 9.5% silicon, 2.75% copper, 2.8% titanium, 3% molybdenum with the balance essentially nickel was fractured at one point completely through the wall. The fractured metal was ground away to provide a V-groove. In accordance with the invention, the ring was then preheated to 900° C. and the V-groove was filled with weld metal in five passes by oxyacetylene gas flame welding using a welding filler rod, also preheated to 900° C., having the nominal composition 9.5% silicon, 2.5% copper, 3% molybdenum and 4% titanium with the balance nickel and a flux containing 50% sodium fluoride, 40% sodium silicate and 10% lithium chloride. The resultant weld was subjected to corrosion tests in sulfuric acid and found to be equal to the base metal of the ring in ability to resist this environment. Moreover, the weld showed no cracks; remachining on the outside of the welded area revealed a surface quality at least as good as that of the ring itself and removal of a welded section by spark erosion showed that an excellent underbead profile was obtained.

The welding rod used in the example was cast in a refractory mold, but rods for the invention can also be made by powder metallurgical methods, which are advantageous for accurately controlling the rod composition.

For welidng in accordance with the invention care should be taken to avoid subjecting the alloy to severe thermal shocking, since the alloy has been found sensitive to sudden thermal changes. From this viewpoint, electric arc methods of welding are to be avoided. Indeed severe cracking has been encountered when attempts were made to weld the alloy by argon-shielded tungsten-arc methods using filler metal of matching composition.

The present invention is particularly applicable to welding for joining or repairing articles made of the quinary nickel-silicon-titanium-copper-molybdenum alloys referred to herein, provided of course that the size or situation of the article does not render preheating impractical. Thus, in view of the foregoing, it is to be understood that the invention is applicable to joining and to repair welding of cast pipe fittings, e.g., unions, elbows, T's, flanges etc., and other piping components that have use in corrosion-resistant apparatus for containing and/or transmitting sulfuric acid.

Although the present invention has been described in conjunction with certain advantageous embodiments, it is to be understood that other embodiments, which also may be advantageous, and modifications and variations may be resorted to without departing from the spirit and scope of the invention, as those skilled in the art will readily understand. Such other embodiments, modifications and variations are considered to be within the purview and scope of the invention and appended claims.

I claim:
1. A welidng flux consisting essentially of a dry powder mixture of 30% to about 60% sodium fluoride, about 30% to about 60% dehydrated sodium silicate, about 5% to about 15% lithium chloride and up to 35% sodium carbonate.
2. A welding flux as set forth in claim 1 consisting essentially of 45% to 55% sodium fluoride, 35% to 45% dehydrated sodium silicate, and 5% to 15% lithium chloride.

References Cited
UNITED STATES PATENTS 2,435,198  2/1948  Browne _____ 148—24
2,514,386  7/1950  Gayley _____ 148—24

L. DEWAYNE RUTLEDGE, Primary Examiner
W. W. STALLARD, Assistant Examiner

U.S. Cl. X.R.
148—26; 29—496